(12) United States Patent
Itoh et al.

(10) Patent No.: US 7,274,012 B2
(45) Date of Patent: Sep. 25, 2007

(54) OPTICAL FIBER PROBE, LIGHT DETECTION DEVICE, AND LIGHT DETECTION METHOD

(75) Inventors: Izumi Itoh, Kanagawa (JP); Masato Takada, Kanagawa (JP); Taroh Terashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 70 days.

(21) Appl. No.: 11/177,446

(22) Filed: Jul. 11, 2005

(65) Prior Publication Data

US 2006/0006317 A1 Jan. 12, 2006

(30) Foreign Application Priority Data

Jul. 12, 2004 (JP) .............................. 2004-205254

(51) Int. Cl.
*H01J 3/14* (2006.01)
(52) U.S. Cl. .................. 250/234; 250/227.11; 73/105; 385/123
(58) Field of Classification Search ................ 250/234, 250/235, 216, 227.11; 73/105; 385/123, 385/128
See application file for complete search history.

(56) References Cited

U.S. PATENT DOCUMENTS

| | | | | |
|---|---|---|---|---|
| 5,361,314 A | * | 11/1994 | Kopelman et al. | 385/12 |
| 5,664,036 A | * | 9/1997 | Islam | 385/31 |
| 5,928,525 A | * | 7/1999 | Ohtsu et al. | 216/24 |
| 6,236,783 B1 | * | 5/2001 | Mononobe et al. | 385/43 |
| 6,370,306 B1 | * | 4/2002 | Sato et al. | 385/129 |
| 6,744,037 B2 | | 6/2004 | Yoshikawa et al. | |
| 2003/0085351 A1 | * | 5/2003 | Nakajima et al. | 250/306 |

FOREIGN PATENT DOCUMENTS

| | | |
|---|---|---|
| EP | 0 763 742 A1 | 3/1997 |
| JP | 2000-55818 | 2/2000 |
| JP | 3053380 | 4/2000 |
| JP | 2001-249297 | 9/2001 |
| JP | 3231675 | 9/2001 |
| JP | 2001-311899 | 11/2001 |
| JP | 2002-25105 | 1/2002 |

(Continued)

OTHER PUBLICATIONS

L. Novotny, et al., "Scanning near-field optical probe with ultrasmail spot size", Optical Letters, vol. 20, No. 9, XP-000503693, May 1, 1995, pp. 970-972.

(Continued)

*Primary Examiner*—Thanh X. Luu
*Assistant Examiner*—Stephen Yam
(74) *Attorney, Agent, or Firm*—Oblon, Spivak, McClelland, Maier & Neustadt, P.C.

(57) ABSTRACT

An optical fiber probe is disclosed that comprises an optical fiber and an optical probe. The optical fiber includes a core though which light emitted from a light source travels. The optical probe is configured to emit the light from a projecting end portion of the core. An inclination angle of a normal line of a part or all of a surface of the optical probe with respect to an optical axis of propagating light that travels through the core is smaller than a total reflection angle of the propagation light but greater than zero degrees.

10 Claims, 5 Drawing Sheets

FOREIGN PATENT DOCUMENTS

| | | |
|---|---|---|
| JP | 2002-25106 | 1/2002 |
| JP | 2002-133707 | 5/2002 |
| JP | 2002-133708 | 5/2002 |
| JP | 2002-208156 | 7/2002 |
| JP | 2002-228889 | 8/2002 |
| JP | 2002-365578 | 12/2002 |
| JP | 2003-42897 | 2/2003 |
| JP | 2003-57148 | 2/2003 |
| JP | 2003-151170 | 5/2003 |
| JP | 2003-177343 | 6/2003 |
| JP | 2003-263774 | 9/2003 |
| JP | 2004-70429 | 3/2004 |
| JP | 2004-101378 | 4/2004 |

OTHER PUBLICATIONS

T. Saiki, et al., "Tailoring a high-transmission fiber probe for photon scanning tunneling microscope", Appl. Phys. Lett., vol. 68, No. 19, XP-000588304, May 6, 1996, pp. 2612-2614.

E. L. Buckland, et al., "Resolution in collection-mode scanning optical microscopy", Journal of Applied Physics, vol. 73, No. 3, XP-000335360, Feb. 1, 1993, pp. 1018-1028.

* cited by examiner

OPTICAL FIBER PROBE, LIGHT DETECTION DEVICE, AND LIGHT DETECTION METHOD

BACKGROUND OF THE INVENTION

1. Field of the Invention

The present invention relates to an optical fiber probe, a light detection device, and a light detection method applicable to a scanning probe microscope for nano-order measurements/processing, and usable as a measurement/evaluation device in various fields such as semiconductors and biotechnology.

2. Description of the Related Art

In recent years, SPM (Scanning Probe Microscope) techniques including STMs (Scanning Tunnel Microscopes) and AFMs (Atomic Force Microscopes) have been used in nano-order measurements/processing. Among SPMs, SNOMs (Scanning Near-field Optical Microscopes) capable of detecting optical properties of areas smaller than the diffraction limit are used as measurement/evaluation devices in various fields such as semiconductors and biotechnology. Meanwhile, optical recording devices and micromachining devices utilizing these SNOMs have been researched and developed.

This type of a SNOM uses a microstructure smaller than the diffraction limit as a probe, and is configured to illuminate a tip of the probe to generate near-field light thereabout. The probe scans over a sample surface to detect light scattered due to electromagnetic interactions between the near-field light locally generated around the probe and the sample surface or to detect near-field light transmitted through the sample surface. Thus, optical information of the sample surface (light intensity, spectrum, polarization, etc.) is obtained.

A typical SNOM comprises an optical fiber including a core surrounded by a cladding, and an optical probe including a projection that is formed by a tapered projecting end of the core and covered with metal such as Au and Ag. The SNOM can provide optical images with a resolution finer than the light wavelength.

In a measurement of the property of a small area of a sample, the SNOM detects evanescent light locally generated on the small area of the sample surface smaller than the wavelength to measure the shape of the sample. The evanescent light generated by illuminating the sample in a total reflection condition is converted into scattering light. This scattering light is guided by the core of the optical fiber through the projection of the optical probe so as to be detected by a detector connected to the other end of the optical fiber. That is, this SNOM can perform scattering and detection using the optical probe.

Japanese Patent No. 3231675 and Japanese Patent Laid-Open Publication No. 11-271339 disclose a SNOM of this type.

Although SNOMs offer high-resolution measurements, they have a disadvantage in that the measurement range is as small as several tens of micrometers.

The resolution of a SNOM is determined by the diameter of an opening of an optical probe in use. For lowering the resolution in a property measurement, a low-resolution optical probe having a greater opening diameter needs to be attached to the SNOM. Use of the low-resolution optical probe having a greater opening diameter allows for measuring a larger area. However, because a beam emitted from the optical probe has a broad angular diffusion, the optical probe needs to be kept close to the sample surface. As this involves a risk that the optical probe may contact the sample, the scanning speed in a measurement operation cannot be increased. Therefore, it is practically difficult to measure a large area.

Recently, in silicon wafer defect inspections, there has been a demand for performing a high-resolution measurement after a low-resolution measurement utilizing near-field light for measuring and inspecting a sample continuously. To meet such a demand, an inspection device is proposed that comprises a regular optical microscope into which a near-field light detection optical probe is installed in addition to a regular observation system including an objective lens (see, for example, Japanese Patent Laid-Open Publication No. 2000-55818).

An inspection device disclosed in the above publication is configured such that, after specifying a small area whose property is to be measured based on results of a large area measurement using an objective lens, a near-field light detection optical probe is aligned with the small area to perform a near-field measurement. With this inspection device, however, alignment of the optical probe to the specified small area is very difficult, making the measurement and inspection process time-consuming.

SUMMARY OF THE INVENTION

A general object of the present invention is to provide an optical fiber probe, a light detection device, and a light detection method to solve at least one problem described above.

A first specific object of the present invention is to eliminate the need for maintaining an optical probe close to a sample surface for eliminating a risk of the optical probe contacting the sample surface, thereby enabling increasing the scanning speed in a measurement operation and thus measuring a large area with a reduced time.

A second specific object of the present invention is to perform a large area measurement utilizing propagation light and a high-resolution measurement utilizing near-field light with use of a single optical probe so as to facilitate complex alignment of the optical probe.

A basic configuration for achieving these objects of the present invention is a configuration wherein light transmitted from an optical fiber to an optical probe is made incident on an end face of the optical probe at an incident angle smaller than a total reflection angle but greater than zero degrees, thereby increasing the amount of light emitted from the optical probe and forming a light spot at a position away from the optical probe tip.

According to an aspect of the present invention, there is provided a light detection device, comprising: a light source to emit light; a wavelength controller to control a wavelength of the light emitted from the light source so as to form the light spot in a desired shape; an optical fiber probe that includes an optical fiber including a core through which the light emitted from the light source travels and an optical probe configured to emit the light from a projecting end portion of the core; a movement controller to move either one of the optical fiber probe and a sample in a direction toward and away from the other one such that a light spot of propagating light traveling through the core is formed on a surface of the sample to be measured; and a detector to detect light returning from the surface to be measured. An inclination angle of a normal line of a part or all of a surface of the optical probe with respect to an optical axis of the propagating light that travels through the core is smaller than a total reflection angle of the propagation light but greater than zero degrees.

DETAILED DESCRIPTION OF THE PREFERRED EMBODIMENT

The object of the present invention of eliminating a risk of the optical probe contacting a sample surface, thereby increasing the scanning speed in a measurement operation and thus measuring a large area within a reduced time frame is achieved by specifying the inclination of a surface (end face) of an optical probe with respect to propagating light traveling through an optical fiber.

First Embodiment

This section provides an overview of a light detection device 1 and a measurement process thereof according to a first embodiment of the present invention with reference to FIGS. 1A-3.

Figure 1A:
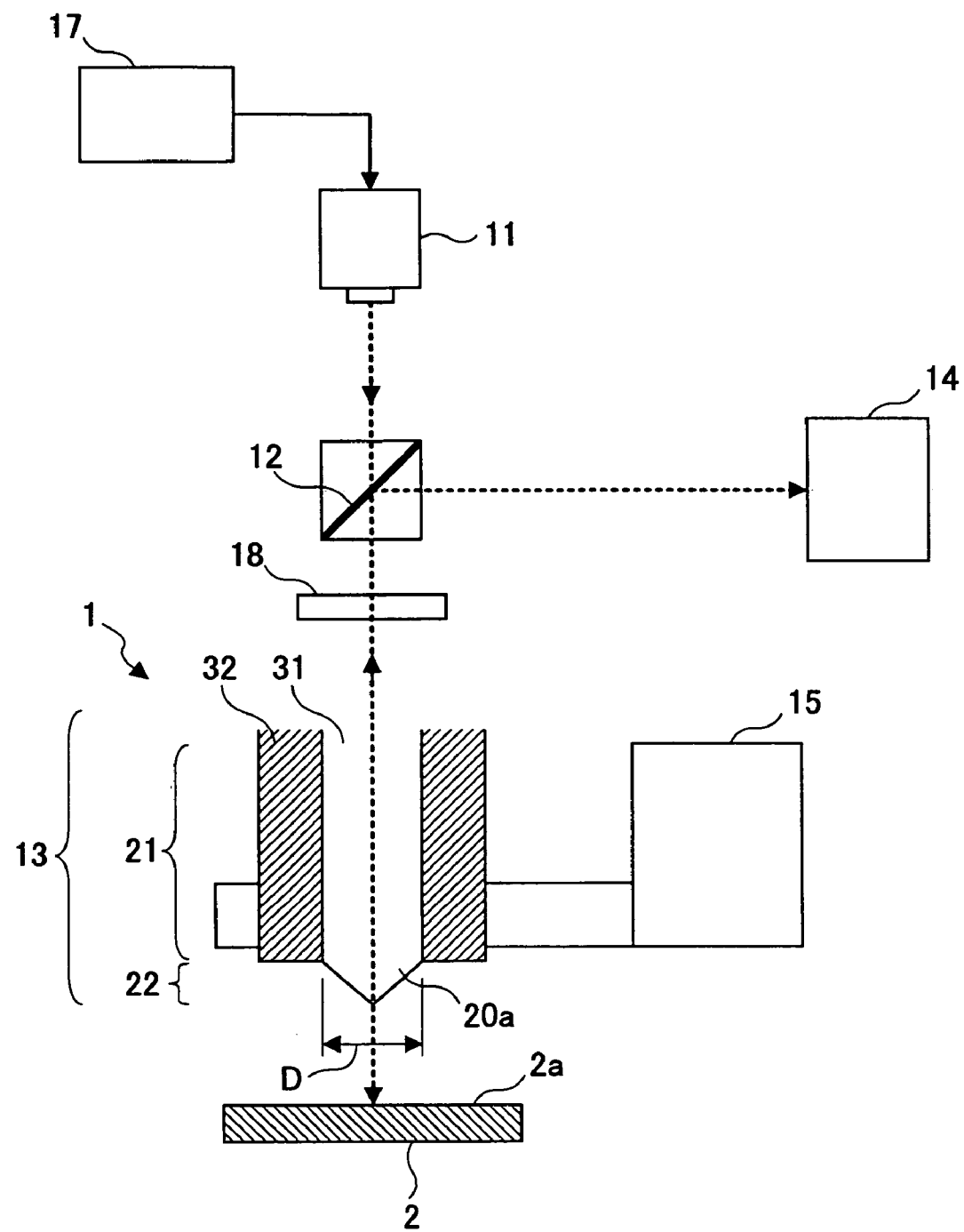
FIG. 1A is a schematic diagram illustrating an embodiment of a light detection device with an optical fiber probe according to the present invention.
Figure 1B:
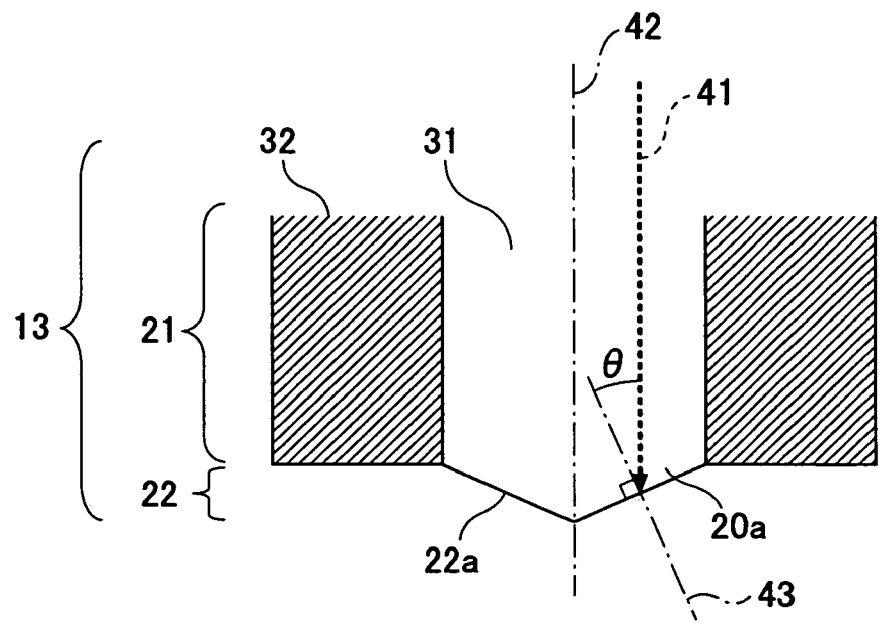
FIG. 1B is an enlarged cross-sectional view illustrating an optical fiber probe having a projecting core with a conical tapered surface according to the present invention.
Figure 1C:
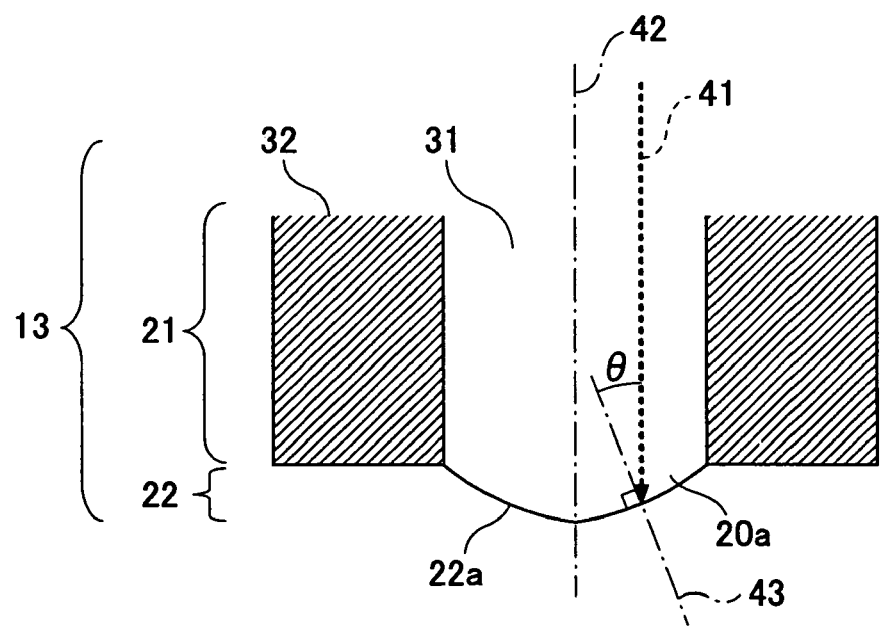
FIG. 1C is an enlarged cross-sectional view illustrating an optical fiber probe having a projecting core with a curved surface according to the present invention.
Figure 2:
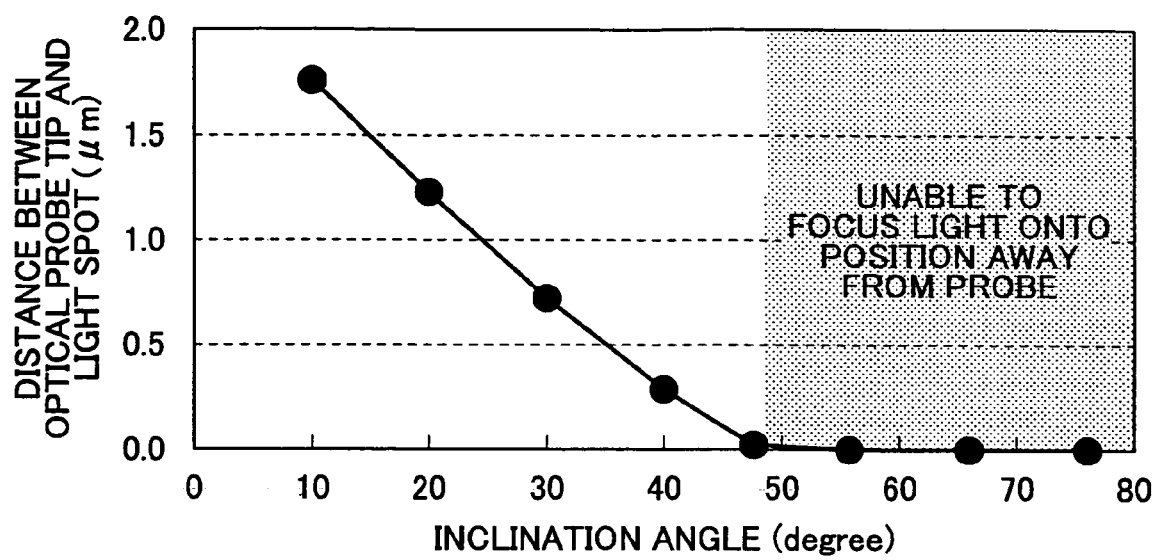
FIG. 2 is a graph showing the relationship between the inclination angle of a projecting core surface of an optical probe and the distance from an optical probe tip to a light spot.
Figure 3:
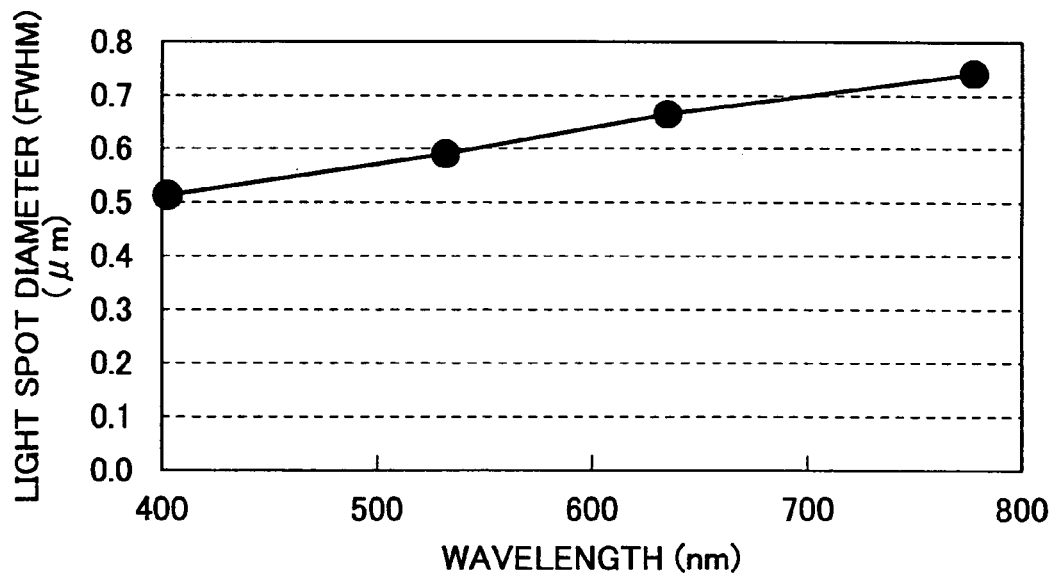
FIG. 3 is a graph showing the relationship between the wavelength of propagating light and the light spot diameter in a condition where the inclination angle of a projecting core surface is 10 degrees.

FIG. 1A is a schematic diagram illustrating the light detection device 1 with an optical fiber probe 13. FIGS. 1B and 1C are enlarged cross-sectional views illustrating the optical fiber probe 13. FIGS. 2 and 3 are graphs showing a property of the optical fiber probe 13.

The light detection device 1 shown in FIG. 1A is applicable to, for example, a SNOM (Scanning Near-field Optical Microscope) for measuring the optical property of a small area of a sample. The light detection device 1 comprises a light source 11 that emits light, a polarization beam splitter 12 disposed in a light path of the light emitted by the light source 11, a ¼ wavelength plate 18 disposed in a light path of the light transmitted through the polarization beam splitter 12, the optical fiber probe 13 that collects the light transmitted through the ¼ wavelength plate 18 to irradiate a surface (sample surface) 2a of a sample 2 to be measured with the light, and a light detector 14 that detects returning light from the sample surface 2a.

The light source 11 emits light with drive power supplied from a power unit (not shown). A light wavelength converter 17 is capable of changing wavelength of the light that the light source 11 emits. As described below, the light wavelength converter 17 controls a light spot diameter by changing the wavelength.

The polarization beam splitter 12 is configured to transmit the light emitted by the light source 11 so as to guide it to the sample surface 2a through the ¼ wavelength plate 18, and to reflect the returning light from the sample surface 2a so as to guide it to the light detector 14.

Linearly-polarized light emitted by the light source 11 is converted into circularly-polarized light by the ¼ wavelength plate 18 while passing therethrough, and then enters a core 31 (to be described below). Circularly-polarized light that is reflected and returned by the sample surface 2a is converted into linearly-polarized light by the ¼ wavelength plate 18 while passing therethrough. Then, the linearly-polarized light, which is polarized at an angle different from the light emitted by the light source 11, is reflected by the polarization beam splitter 12. A regular beam splitter may be used in place of the polarization beam splitter 12.

The optical fiber probe 13 includes an optical waveguide section 21 and a projection 22. The optical waveguide section 21 is formed of an optical fiber having the core 31 surrounded by a cladding 32. The core 31 and the cladding 32 are made of silicon dioxide glass. The composition of the core 31 and the cladding 32 are controlled by addition of germanium or phosphorous to make the refraction index of the cladding 32 lower than the refraction index of the core 31.

The projection 22 includes a core 20a projecting from the cladding 32 at an end of the optical waveguide section 21. The projecting core 20a has a conical shape gradually tapered as shown in FIG. 1A.

FIG. 1B shows the optical fiber probe 13 of the light detection device 1 of FIG. 1B in greater detail. The shape of the projection 22 of the optical fiber probe 13 is described below with reference to FIG. 1B.

When light 41 (hereinafter referred to as propagating light 41) traveling through the core 31 reaches the optical fiber probe 13, the light 41 is emitted outside the optical fiber probe 13 through the projection 22. A surface 22a of the optical fiber probe 13 is formed in a conical tapered shape. An angle θ (hereinafter referred to as inclination angle θ) formed by a normal line 43 and an optical axis 42 of the propagating light 41 is set to be smaller than a total reflection angle but greater than zero degrees. Accordingly, the propagating light 41 incident on the optical fiber probe 13 is emitted to the outside of the optical fiber probe 13, and the emitted light is focused on a position a few hundred nanometers through a few micrometers away from the tip of the optical fiber probe 13 to form a light spot with a high light intensity.

The surface 22a of the optical fiber probe 13 may alternatively be formed in a curved shape as shown in FIG. 1C, wherein an angle θ formed by a normal line 43 and the optical axis 42 of the propagating light 41 is set to be smaller than a total reflection angle but greater than zero degrees.

Only when the inclination angle θ is smaller than the total reflection angle, light is focused onto a position away from the tip of the optical fiber probe 13 to form a light spot with a high light intensity. A conventional optical fiber probe having an inclination angle θ equal to or greater than the total reflection angle is only able to form a light spot with a low light intensity. This is because the light intensity is maximized in the vicinity of the optical probe tip and rapidly drops along with the incrementing of the distance from the optical probe tip.

The graph of FIG. 2 shows an example of the relationship between the inclination angle of the optical fiber probe 13 and the distance from the optical probe tip to the light spot under a condition in which the diameter D of a proximal portion of the core 20a is 2 μm, the refraction index is 1.53, and the emission medium is air. According to the property shown in the graph of FIG. 2, the light is focused onto a position about a few hundred nanometers through a few micrometers away from the tip of the optical fiber probe 13.

The light spot diameter can be controlled by varying the diameter D of the proximal portion of the core 20a projecting from the cladding, the inclination angle θ, and the wavelength of the propagating light 41. By utilizing this feature, the diameter D of the proximal portion of the core 20a, the inclination angle θ, and the wavelength of the propagating light 41 are determined so as to have a light spot diameter that meets a required measurement resolution.

The light spot diameter can be reduced by reducing the diameter D of the proximal portion of the core 20a, decreasing the inclination angle θ, and using the propagating light 41 having a short wavelength. On the other hand, the light spot diameter can be increased by increasing the diameter D of the proximal portion of the core 20a, increasing the inclination angle θ, and using the propagating light 41 having a long wavelength.

The graph of FIG. 3 shows an example of the relationship between the wavelength of the propagating light 41 and the light spot diameter under a condition in which the diameter D of the proximal portion of the core 20a is 2 μm, the refraction index is 1.53, and the emission medium is air.

For example, for setting the light spot diameter to 0.5 μm (full-width at half-maximum) when the light is emitted from the core 20a having a refraction index 1.5, the diameter D of the proximal portion of the core 20a needs to be set to 2 μm, and the wavelength of the propagating light 41 needs to be 0.4 μm. In this case, the distance between the optical probe tip and the light spot becomes 1.2 μm.

Referring back to FIG. 1A, the optical fiber probe 13 is mounted on a probe controller 15. The probe controller 15 includes, for example, a triaxial actuator, and is configured to move the optical fiber probe 13 in a direction toward and away from the sample surface 2a, and to move the optical fiber probe 13 to scan in the horizontal direction. The probe controller 15 may be configured to move the sample surface 2a in a direction toward and away from the optical fiber probe 13, instead of moving the optical fiber probe 13 in the direction toward and away from the sample surface 2a.

The light detector 14 generates luminance signals by converting the returning light from the sample surface 2a. An image created in accordance with the generated luminance signals is displayed on a display unit (not shown). With the image displayed on the display unit, a user is able to measure and observe the details of the sample surface 2a.

As for the detection of the returning light from the sample surface 2a, if the sample 2 is light transmissive, the light detector 14 may be disposed at a side opposite to the optical fiber probe 13 with respect to the sample 2 so as to detect the light.

A measurement process using the above-described light detection device 1 is illustrated below with reference to FIG. 1A.

Light with a wavelength λ containing linearly-polarized components emitted from the light source 11 passes through the polarization beam splitter 12, and subsequently passes through the ¼ wavelength plate 18, in the which the polarized components of the light are controlled. Then, the light enters the optical fiber probe 13. The light incident on the optical fiber probe 13 is transmitted through the core 31, and then emitted from the optical fiber probe 13. The emitted light is focused onto a position away from the tip of the optical fiber probe 13 to form the optical spot.

The probe controller 15 moves the optical fiber probe 13 in the direction toward and away from the sample surface 2a so as to match the position of the sample surface 2a to the position of the light spot formed by the focused light. Information about the distance between the optical probe tip and the light spot used herein is prepared in advance based on experiments.

Then, the probe controller 15 scans the optical fiber probe 13 in the horizontal direction with respect to the sample surface 2a, so the light detector 14 receives the light emitted from the optical fiber probe 13 and returned from the sample surface 2a. In this way, a user can obtain detailed optical property information of the sample surface 2a from an image displayed on the display unit (not shown).

If the optical fiber probe 13 is kept at a constant height relative to the sample surface 2a during the scanning operation of the optical fiber probe 13 in the horizontal direction with respect to the sample surface 2a, a need for controlling the optical fiber probe 13 in the direction toward and away from sample surface 2a is eliminated. This allows a high-speed scanning operation and a great reduction of the measurement time while taking advantage of the above-described distance between the optical probe tip and the light spot (a few hundred nanometers through a few micrometers). Compared to conventional near-field light measurements, a measurement area per measurement point is larger. Therefore, a larger area can be measured even when the same number of measurement points or measurement lines (scan lines) is provided.

Moreover, compared to a case where light emitted from the optical fiber probe 13 is not focused, a larger amount of returning light from the sample surface 2a can be collected. Consequently, high-contrast measurement results with an improved SNR (signal-to-noise ratio) can be provided.

The light detection device 1 capable of efficiently detecting light and quickly measuring a larger area can be thus realized.

In accordance with the first embodiment of the present invention, the following effects and advantages can be achieved.

By limiting the incident angle of the light transmitted from the optical fiber to the optical probe with respect to the end face (surface) of the optical probe to a predetermined range, the light emitted from the optical probe can form a light spot having a high light intensity at a position away from the optical probe tip.

As the light spot can be formed at a position away from the optical probe tip, light returning from the sample can be efficiently collected. Furthermore, because there is no need to maintain the optical probe close to the sample surface, a risk of the optical probe contacting the sample surface is avoidable. Accordingly, the scanning speed in a measurement operation is increased, thereby measuring a large area with a reduced time.

By controlling the wavelength of the light incident on the optical probe, the diameter and a position of the light spot can be adjusted as desired. This allows for selecting an appropriate measurement resolution.

By setting the inclination angle of the end face of the optical probe to a predetermined angle, the diameter of a spot light and a light focusing position can be set as desired. This also allows for selecting an appropriate measurement resolution.

By setting the diameter of a proximal portion of a core projecting part of the optical probe to a predetermined diameter, the diameter of a spot light and a light focusing position can be set as desired. This also allows for selecting an appropriate measurement resolution.

Second Embodiment

Figure 4:
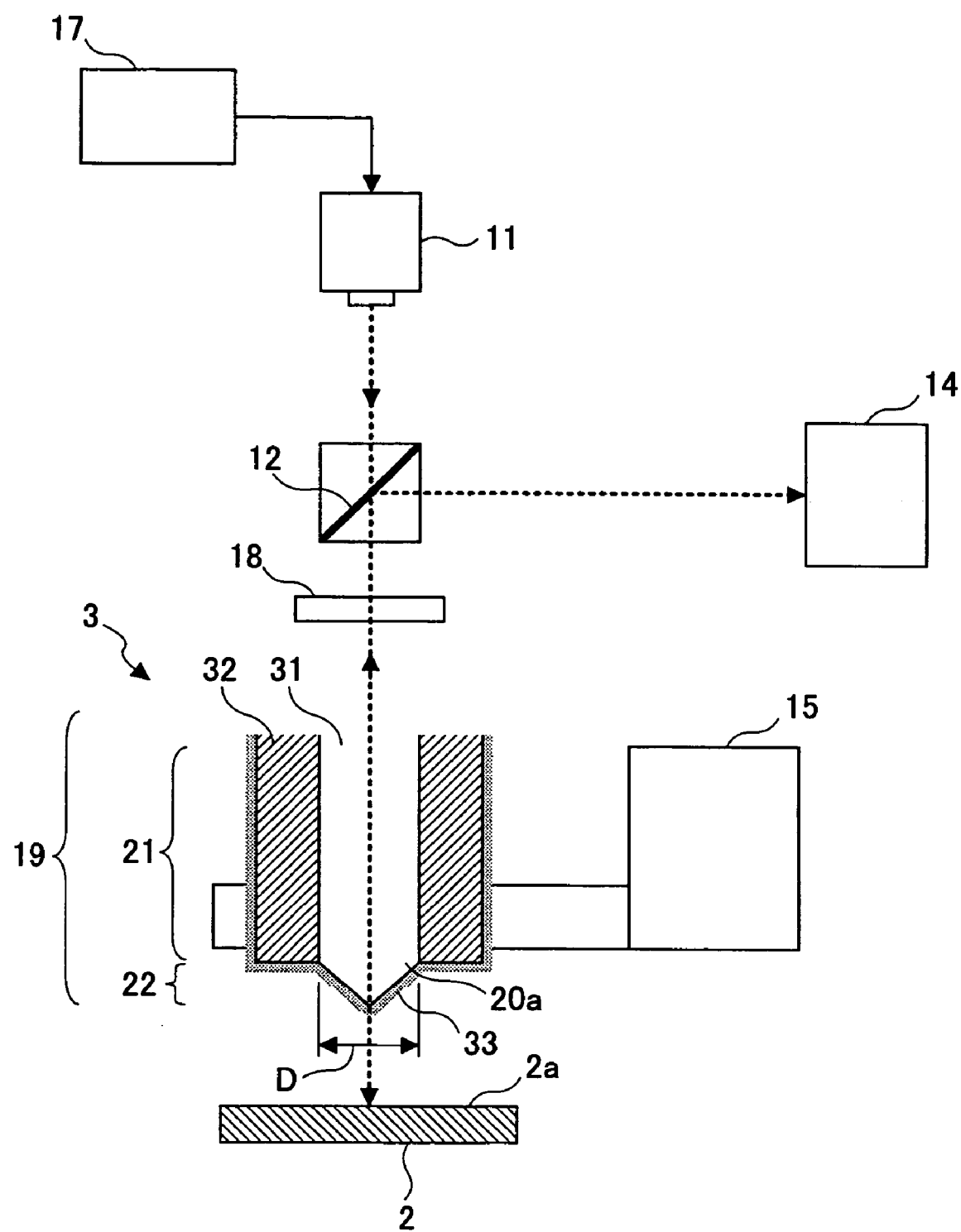
FIG. 4 is a schematic diagram illustrating another embodiment of a light detection device with an optical fiber probe according to the present invention.
Figure 5:
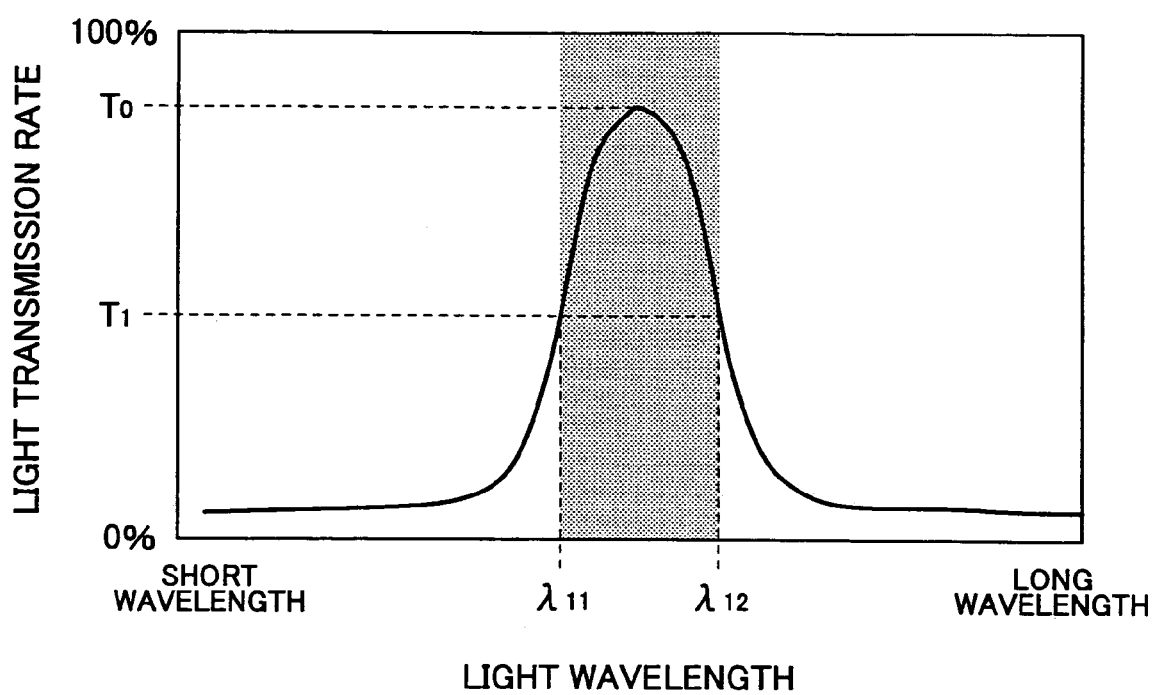
FIG. 5 is a graph showing the relationship between the light transmission rate of a light-shielding covering and the wavelength.

This section provides an overview of a light detection device 3 and a measurement process thereof according to a second embodiment of the present invention with reference to FIGS. 4 and 5. FIG. 4 is a schematic diagram illustrating the light detection device 3 with an optical fiber probe 19, which is different from the optical fiber probe 13 of the first embodiment. FIG. 5 is a graph showing the light transmission rate of a light-shielding covering layer 33.

The light detection device 3 of the second embodiment is configured to provide propagating light measurements and near-field light measurements. The light detection device 3 is different from the light detection device 1 (see FIG. 1A) of the first embodiment in that the optical fiber probe 19 is covered with the light-shielding covering layer 33. Due to this difference, the light detection device 3 can provide near-field light measurements in addition to propagating light measurements.

The structure and a process of a near-field measurement (high-resolution measurement) are as follows.

Light containing linearly-polarized components emitted from a light source 11 passes through a polarization beam splitter 12, and subsequently passes through a ¼ wavelength plate 18, in which the polarized components of the light are controlled. Then, the light enters the optical fiber probe 19. The light incident on the optical fiber probe 19 travels through the core 31 to enter the light-shielding covering layer 33 of the optical fiber probe 19. Then, near-field light as near-field waves penetrates through to an emission (outer) side of the light-shielding covering layer 33 from the optical fiber probe 19. The optical fiber probe 19 with the near-field light penetrating through to the outside is moved closer to a sample surface 2a by a probe controller 15. When the distance between the tip of the optical fiber probe 19 and the sample surface 2a becomes equal to or less than a quarter of a wavelength λ of the light emitted from the light source 11, the light penetrating through from the optical fiber probe 19 is projected onto the sample surface 2a to form a small light spot on the sample surface 2a with the near-field light. The near-field light forming the light spot is guided to a light detector 14 through the light-shielding covering layer 33. In this way, the sample surface 2a can be measured with a high resolution.

It is preferable that the light-shielding covering layer 33 include an Au film in view of a near-field light intensification effect thereof due to surface plasmon resonance and a high chemical stability thereof, although the light-shielding covering layer 33 may be made of other materials. The Au film can intensify the near-field light depending on the choice of wavelength emitted from the light source 11, resulting in improvement of near-field light generation efficiency and the SNR. In the case of Au, for example, the near-field light intensification effect generally becomes most pronounced when the wavelength is within a range from about 500 through 600 nm.

The structure and a process of a propagating light measurement are as follows.

Depending on the material and the thickness of the light-shielding covering layer 33 and the choice of the wavelength emitted from the light source 11, the optical fiber probe 19 having the light-shielding covering layer 33 can provide the same propagating light measurement as the optical fiber probe 13 not having the light-shielding covering layer 33 (see the above description about the first embodiment and FIG. 1A).

For example, if the light-shielding covering layer 33 is made of Au and has a thickness of 80 nm or less, light can be focused at a position a few hundred nanometers through a few micrometers away from the tip of the optical probe to form a light spot having a high light intensity although the light intensity is slightly lower compared to the optical fiber probe 13 not having the light-shielding covering layer 33.

Moreover, in view of a dispersion property of complex refraction index of the light-shielding covering layer 33, the intensity of the light emitted from the optical fiber probe 19 can be improved by selecting a wavelength that maximizes or nearly maximizes the light transmission rate. The light transmission rate generally changes to form a convex curve shown in FIG. 5. The wavelength that maximizes or nearly maximizes the light transmission rate referred to herein indicates a wavelength within a wavelength band (a shaded region of the graph of FIG. 5) greater or equal to $\lambda_{11}$ but less than or equal to $\lambda_{12}$, wherein $\lambda_{11}$ and $\lambda_{12}$ are wavelengths that correspond to a light transmission rate $T_1$ which is a half of a maximum light transmission rate $T_0$.

For example, if the light-shielding covering layer 33 is made of Au, a wavelength within the wavelength band of about 480 through 700 nm is a preferable choice.

The relationship of an inclination angle of the optical fiber probe 19 and a diameter D of a proximal portion of the core 20a relative to a light spot diameter is substantially the same as in the optical fiber probe 13 (FIG. 1A) not having the light-shielding covering layer 33 in the first embodiment.

The measurement process is also substantially the same as the process described in the first embodiment. Therefore, as with the light detection device 1 in the first embodiment, the light detection device 3 can also efficiently detect light and quickly measure a larger area in propagating light measurements.

As such, the light detection device 3 is capable of switching between a spot of the propagating light and a spot of the near-field light to selectively form them on the sample surface 2a by moving the mounted single optical fiber probe 19 in a direction toward and away from the sample surface 2a. Therefore, the light detection device 3 can realize both large area measurements utilizing propagating light and high-resolution measurements utilizing near-field light by using the single optical fiber probe 19.

As described above, a measurement system that can provide high-resolution measurements utilizing near-field light does not need to have an optical probe exclusively used for large area measurements. This allows a reduction of the device size, a reduction of the number of units, and a great reduction of production costs.

The following describes a process of switching from a large area measurement with propagating light to a high-resolution measurement with near-field light for measuring the sample 2 continuously with reference to FIG. 4.

Light with a wavelength λ containing linearly-polarized components emitted from the light source 11 passes through the polarization beam splitter 12, and subsequently passes through the ¼ wavelength plate 18, in the which polarized components of the light are controlled. Then, the light enters the optical fiber probe 19. The light incident on the optical fiber probe 19 is transmitted through the core 31, and then emitted from the optical fiber probe 19. The emitted light is focused onto a position away from the tip of the optical fiber probe 19 to form the optical spot.

The probe controller 15 moves the optical fiber probe 19 in the direction toward and away from the sample surface 2a so as to match the position of the sample surface 2a to the position of the light spot formed by the focused light. Information about the distance between the optical probe tip and the light spot used herein is prepared in advance based on experiments.

Then, the probe controller 15 scans the optical fiber probe 13 in the horizontal direction with respect to the sample surface 2a, so the light detector 14 receives the light emitted from the optical fiber probe 19 and returned from the sample surface 2a. In this way, a user can obtain detailed optical property information of the sample surface 2a from an image displayed on the display unit (not shown).

Based on the image displayed on the display unit (not shown), the user specifies a small area whose property to be measured in more detail and aligns the optical fiber probe 19 with the specified small area by moving the optical fiber probe 19 in the horizontal direction. Then, a near-field light measurement (high-resolution measurement) for the small area is carried out.

With the operations described above, the sample 2 can be measured continuously by switching from a large area measurement with propagating light to a high-resolution measurement with near-field light without changing optical probes to be used. Because a high-resolution measurement can be performed with the same axis as a large area measurement, a user can perform a high-resolution measurement using the optical probe of which position is already aligned with a desired small area without troublesome operations.

In accordance with the second embodiment of the present invention, the following effects and advantages can be achieved.

By limiting the incident angle of the light transmitted from the optical fiber to the optical probe with respect to the end face (surface) of the optical probe to a predetermined range and by covering the surface (end face) of the optical probe with the light-shielding covering layer, the light emitted from the optical probe can form a light spot having a high light intensity at a position away from the optical probe tip, and can generate near-field light near the optical probe tip.

It is possible to form a light spot of propagating light at a position away from the optical probe tip, to form a light spot of near-field light at a position near the optical probe tip, and to locate the light spot of propagating light and the light spot of near-field light onto the sample surface by relatively moving the optical fiber probe and the sample to be close to or away from each other. Therefore, both a propagation light measurement utilizing propagation light and a near-field light measurement utilizing near field light can be performed with a single probe. This eliminates the need for complex alignment of the optical probe at the time of switching from the propagation light measurement to the near-field light measurement, thereby increasing measurement/inspection speed.

In a propagation light measurement, it is possible to efficiently collect the light returning from the sample and to increase the scanning speed during the measurement, thereby measuring a large area within a reduced time frame. In a near-field light measurement, the sample can be measured with a high resolution.

As the wavelength of the light incident on the optical probe is controlled in accordance with at least the light-shielding covering layer or the inclination angle, it is possible to set the diameter of the light spot, a light intensity, and a light focusing position as desired in a propagation light measurement, and to provide near-field light with a high light intensity in a near-field light measurement. This allows for selecting an appropriate measurement resolution in a propagation light measurement, and to collect detection signals having a high SNR (signal-to-noise ratio) in a near-field light measurement.

By setting the inclination angle of the optical probe to a predetermined angle, the diameter of the light spot and a light focusing position can be set as desired. This allows to selecting an appropriate measurement resolution.

By setting the diameter of a proximal portion of the core projecting part of the optical probe to a predetermined diameter, the diameter of the light spot and a light focusing position can be set as desired. This also allows for selecting an appropriate measurement resolution.

The present application is based on Japanese Priority Application No. 2004-205254 filed on Jul. 12, 2004, with the Japanese Patent Office, the entire contents of which are hereby incorporated by reference.

What is claimed is:

1. A light detection device, comprising:
   a light source to emit light;
   a wavelength controller to control a wavelength of the light emitted from the light source so as to form the light spot in a desired shape;
   an optical fiber probe that includes
      an optical fiber including a core through which the light emitted from the light source travels; and
      an optical probe configured to emit the light from a projecting end portion of the core;
   a movement controller to move either one of the optical fiber probe and a sample in a direction toward and away from the other one such that a light spot of propagating light traveling through the core is formed on a surface of the sample to be measured; and
   a detector to detect light returning from the surface to be measured;
   wherein an inclination angle of a normal line of a part or all of a surface of the optical probe with respect to an optical axis of the propagating light that travels through the core is smaller than a total reflection angle of the propagation light but greater than zero degrees.

2. The light detection device as claimed in claim 1, wherein the optical fiber probe is configured such that the inclination angle is set to a predetermined angle to form the light spot in a desired shape.

3. The light detection device as claimed in claim 1, wherein the optical fiber probe is configured such that a diameter of a proximal portion of a core projecting part of the optical probe is set to a predetermined diameter to form the light spot in a desired shape.

4. A light detection method, comprising the steps of:
   emitting light from a light source;
   controlling a wavelength of the light emitted from the light source so as to form the light spot in a desired shape;
   transmitting the light emitted from the light source through a core of an optical fiber of an optical fiber probe wherein an inclination angle of a normal line of a part or all of a surface of an optical probe with respect to an optical axis of propagating light that travels through the core is smaller than a total reflection angle of the propagation light but greater than zero degrees;

moving either one of the optical fiber probe and a sample in a direction toward and away from the other one such that a light spot of the propagating light traveling through the core is formed on a surface of the sample to be measured; and detecting light returning from the surface to be measured.

5. A light detection device, comprising:

a light source to emit light;

a wavelength controller to set a wavelength of the light emitted from the light source to a predetermined wavelength in accordance with at least the light-shielding covering layer or the inclination angle;

an optical fiber probe that includes:
- an optical fiber including a core through which the light emitted from the light source travels; and
- an optical probe configured to emit the light from a projecting end portion of the core, including a light-shielding covering layer covering a surface of the optical probe and through which near-field light penetrates to the outside;

a movement controller to move either one of the optical fiber probe and a sample in a direction toward and away from the other one such that a light spot of either one of propagating light traveling through the core or the near-field light penetrating through to the outside from the optical probe is formed on a surface of the sample to be measured; and a detector to detect light returning from the surface to be measured;

wherein an inclination angle of a normal line of a part or all of a surface of the optical probe with respect to an optical axis of propagating light that travels through the core is smaller than a total reflection angle of the propagation light but greater than zero degrees.

6. The light detection device as claimed in claim 5, wherein the predetermined wavelength to which the wavelength of the light is set by the wavelength controller is a wavelength that maximizes or nearly maximizes a light transmission rate of the light-shielding covering layer.

7. The light detection device as claimed in claim 5, wherein the optical fiber probe is configured such that the inclination angle is set to a predetermined angle to form the light spot in a desired shape.

8. The light detection device as claimed in claim 5, wherein the optical fiber probe is configured such that a diameter of a proximal portion of a core projecting part of the optical probe is set to a predetermined diameter to form the light spot in a desired shape.

9. A light detection method, comprising the steps of:

emitting light from a light source;

transmitting the light emitted from the light source through a core of an optical fiber of an optical fiber probe wherein an inclination angle of a normal line of a part or all of a surface of an optical probe with respect to an optical axis of propagating light that travels through the core is smaller than a total reflection angle of the propagation light but greater than zero degrees, the optical probe including a light-shielding covering layer covering the surface of the optical probe and through which near-field light penetrates through to the outside;

moving either one of the optical fiber probe and a sample in a direction toward and away from the other one such that a light spot of either one of the propagating light traveling through the core and the near-field light penetrating through to the outside of the optical probe is formed on a surface of the sample to be measured; and detecting light returning from the surface to be measured, wherein a predetermined wavelength to which a wavelenth of the light is set by a wavelength controller is a wavelength that maximizes or nearly maximizes a light transmission rate of the light-shielding covering layer.

10. The light detection method as claimed in claim 9, further comprising a step of:

setting a wavelength of the light emitted from the light source to the predetermined wavelength in accordance with at least the light-shielding covering layer or the inclination angle.

* * * * *